United States Patent [19]

Omiya

[11] 4,426,518

[45] Jan. 17, 1984

[54] PROCESS FOR PRODUCING AN ALKALI SALT OF A CARBOXYMETHYLCELLULOSE ETHER

[75] Inventor: Takeo Omiya, Himeji, Japan

[73] Assignee: Daicel Chemical Industries, Ltd., Sakai, Japan

[21] Appl. No.: 416,751

[22] Filed: Sep. 10, 1982

[30] Foreign Application Priority Data

Sep. 10, 1981 [JP] Japan .................. 56-142731
Apr. 12, 1982 [JP] Japan .................. 57-60576

[51] Int. Cl.³ .................. C08B 11/00; C08B 11/20
[52] U.S. Cl. .................. 536/98; 536/85
[58] Field of Search .................. 536/84, 85, 97, 98

[56] References Cited

U.S. PATENT DOCUMENTS

| | | | |
|---|---|---|---|
| 3,678,031 | 7/1972 | Schoggen | 536/98 |
| 3,900,463 | 8/1975 | Yada et al. | 536/98 |
| 3,965,091 | 6/1976 | Holst et al. | 536/98 |
| 4,017,671 | 4/1977 | Schminke et al. | 536/98 |
| 4,063,018 | 12/1977 | Ohnaka et al. | 536/98 |
| 4,091,205 | 5/1978 | Onda et al. | 536/85 |

Primary Examiner—Ronald W. Griffin
Attorney, Agent, or Firm—Flynn, Thiel, Boutell & Tanis

[57] ABSTRACT

A process is disclosed for the preparation of an alkali salt of a carboxymethylcellulose ether by reacting a cellulosic material with an etherifying agent, in the presence of an alkali, in an aqueous organic solvent, wherein the improvement comprises adding the etherifying agent and only part of the entire amount of said alkali in the initial stage of the reaction, thereby initiating the etherification reaction in the presence of an excess amount of the etherifying agent such that the molar ratio of $$\text{alkali/etherifying agent} = \frac{\left(\begin{array}{c}\text{number of moles}\\\text{of alkali}\\\text{charged}\end{array}\right) - \left(\begin{array}{c}\text{number of moles of}\\\text{alkali neutralized with}\\\text{etherifying agent}\end{array}\right)}{\text{number of moles of etherifying agent charged}}$$

is in the range of 0.10 to 0.99; and subsequently adding the remainder of said alkali in one or more portions in a second stage and carrying out the etherification reaction in such a manner that said molar ratio of alkali etherifying agent in the final stage becomes at least 1.00.

An additional embodiment of the invention comprises repeating this procedure using the product of the first reaction as the starting material in the second reaction, whereby an alkali carboxymethylcellulose salt having a high degree of substitution can be obtained.

15 Claims, 1 Drawing Figure

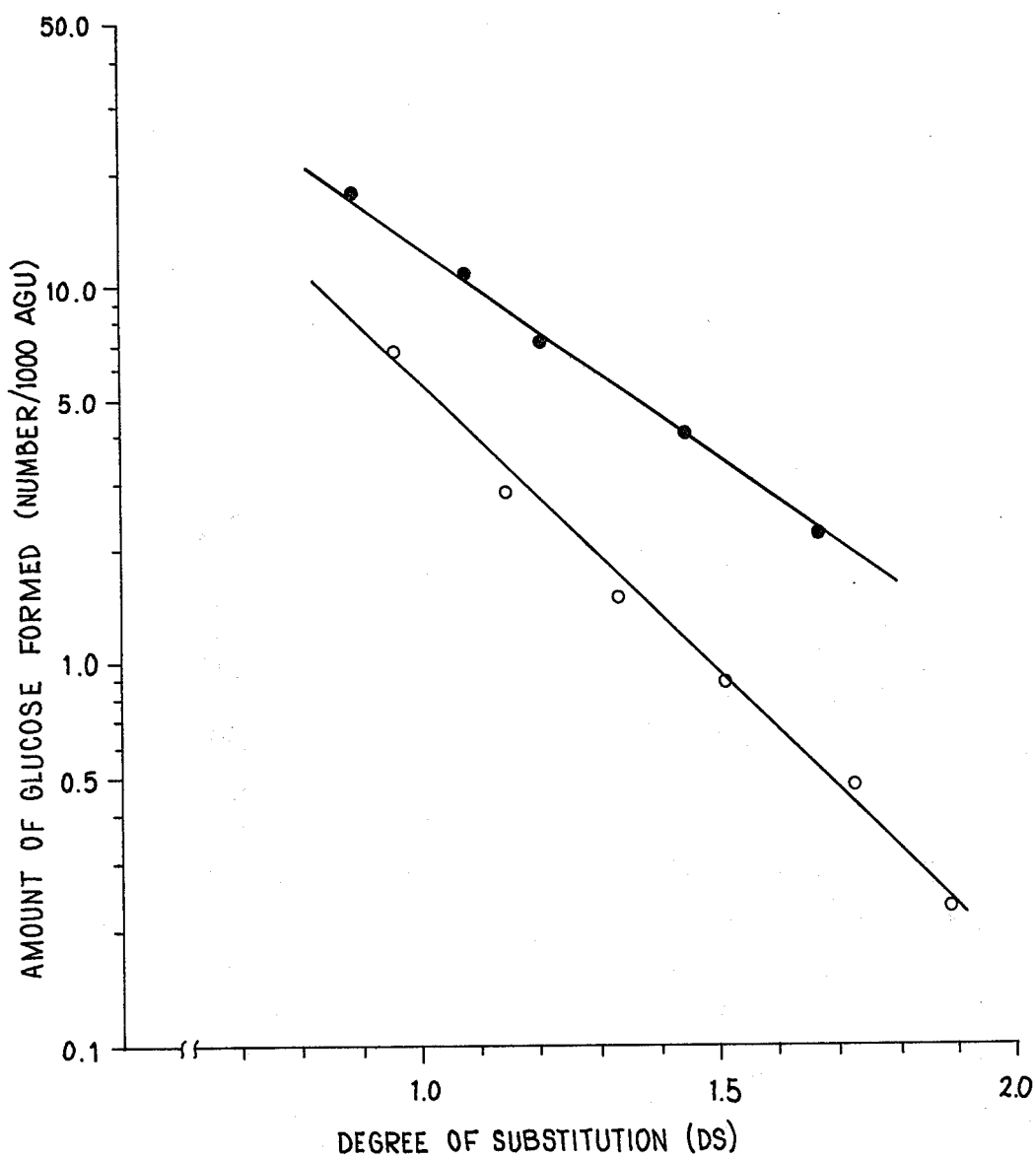

PROCESS FOR PRODUCING AN ALKALI SALT OF A CARBOXYMETHYLCELLULOSE ETHER

The present invention relates to a process for producing an alkali metal salt of carboxymethylcellulose ether (hereinafter referred to as CMC) having a uniform substituent distribution, by means of a solvent process. The term "CMC" is commonly used in the art to mean sodium carboxymethyl cellulose in particular, but in the present context the term "CMC" includes not only the sodium salt, but also, other alkali metal salts, such as the potassium salt.

CMC is generally produced by reacting a cellulosic material with an etherifying agent in the presence of an alkali. It is well known to use sodium hydroxide as the alkali and monochloroacetic acid or its alkali salt as the etherifying agent.

Processes for the production of CMC may be classified roughly into two groups, i.e., (1) aqueous medium processes wherein an aqueous reaction medium is used, and (2) solvent processes wherein an organic solvent, including mixtures of water and one or more organic solvents, is used. Solvent processes have been employed in practice on an industrial scale in many cases because these processes have the advantages that an alkali cellulose can be obtained using the alkali in an amount smaller than the amount required in an aqueous medium process, the etherification reaction is completed in a relatively short period of time, the availability of the etherifying agent is high, the amount of the etherifying agent needed is small and high quality CMC can be obtained.

In the production of CMC according to one solvent process, cellulose is first reacted with sodium hydroxide in an aqueous organic solvent to form an alkali salt of cellulose, and then monochloroacetic acid is added to the reaction mixture to carry out the etherification reaction. In another solvent process, sodium monochloroacetate is added to cellulose in an aqueous organic solvent to impregnate the cellulose with sodium monochloroacetate, and then sodium hydroxide is added thereto to carry out the etherification reaction (Japanese Patent Publication No. 2112/1971). In both processes, the molar ratio of alkali/etherifying agent in the etherification reaction system is given by the formula:

$$\frac{\left(\begin{array}{c}\text{number of moles of}\\\text{alkali charged}\end{array}\right) - \left(\begin{array}{c}\text{number of moles of}\\\text{alkali neutralized with}\\\text{etherifying agent}\end{array}\right)}{\text{number of moles of etherifying agent charged}}$$

This ratio is at least 1.0 and is generally maintained at about 1.10. Hayakawa et al have reported that the optimum alkali/etherifying agent molar ratio range is 1.0–1.30 (Tokyo Kogyo Shikensho HOKOKU, Vol. 55, No. 6 (1960)). This range was selected because, if this molar ratio is above 1.30, a side reaction of sodium monochloroacetate as shown in the following reaction (1) is likely to occur so as to reduce the available content of expensive sodium monochloroacetate, and such a result is economically disadvantageous. On the other hand, if this molar ratio is less than 1.0, glycolic acid is formed by a side reaction according to the following reaction (2) when the alkali in the reaction system has been consumed, thereby making the reaction system acidic. The glycolic acid attacks the carboxyl groups of the CMC, thereby converting part of the CMC into its free acid form and thereby seriously reducing the solubility of the resulting CMC:

$ClCH_2COONa + NaOH \rightarrow CH_2(OH)COONa + NaCl$ (1)

$ClCH_2COONa + H_2O \rightarrow CH_2(OH)COOH + NaCl$ (2)

Therefore, in the production of CMC, the alkali/etherifying agent molar ratio is generally regulated to be about 1.10 so that the etherification reaction is carried out in the presence of an excess amount of the alkali and, after completion of the reaction, the excess alkali is neutralized with, for example, acetic acid, whereby to obtain CMC.

BRIEF DESCRIPTION OF THE DRAWING

The drawing is a graph showing the properties of CMC obtained in the Examples and Comparative Examples.

Upon investigation, the present inventors have discovered that CMC having a uniform substituent distribution can be obtained, with a monochloroacetic acid availability far higher than that of conventional processes, by a process comprising reacting a cellulosic material with an etherifying agent, in the presence of an alkali, in an aqueous organic solvent, to form an alkali salt of carboxymethylcellulose ether, wherein the etherification reaction is initiated in the presence of an excess amount of the etherifying agent such that the molar ratio of alkali/etherifying agent in the reaction system, namely, $$\frac{\left(\begin{array}{c}\text{number of moles of}\\\text{alkali charged initially}\end{array}\right) - \left(\begin{array}{c}\text{number of moles of}\\\text{alkali neutralized with}\\\text{etherifying agent}\end{array}\right)}{\text{number of moles of etherifying agent charged}}$$

is 0.10 to 0.99 during an initial stage after the addition of a portion of the total alkali and a portion, preferably the entire amount, of the etherifying agent, and the etherification reaction is further carried out in a second stage wherein the remainder of the alkali is added in one or more subportions so as to prevent the acidification of the reaction system due to the consumption of the alkali as the etherification reaction proceeds, whereby the molar ratio of alkali/etherifying agent, namely, $$\frac{\left(\begin{array}{c}\text{number of moles of}\\\text{total alkali charged}\end{array}\right) - \left(\begin{array}{c}\text{number of moles of}\\\text{alkali neutralized with}\\\text{etherifying agent}\end{array}\right)}{\text{number of moles of etherifying agent charged}}$$

becomes at least 1.0 when the etherification reaction is completed.

According to the present invention the molar ratio of alkali/etherifying agent in the initial stage of the etherification reaction is regulated to be within the range of 0.10 to 0.99, preferably 0.10 to 0.70, most preferably 0.30 to 0.70, lower than the usual range of 1.0 to 1.30 employed in the conventional processes, such that the reaction in the initial stage is carried out in the presence of an excess amount of the etherifying agent. Consequently, the above-mentioned side reaction (1) is controlled and the availability of monochloroacetic acid is kept high. In the reaction of preparing CMC, the diffusion (or penetration) into the cellulose of sodium monochloroacetate, which has a lower compatibility with cellulose than that of the alkali, is considered to be a rate-controlling step. Therefore, if the etherification reaction of preparing CMC is carried out, in the presence of an excess amount of an alkali, at a temperature of as high as 60° to 80° C., as in the conventional processes, the etherification is completed by the excess amount of the alkali before the sodium monochloroacetate is uniformly diffused or penetrated into the cellulose fibers, resulting in a non-uniform substituent distribution in the obtained CMC. However, if the etherification is initiated and carried out to some extent in the presence of an excess amount of sodium monochloroacetate, according to the present invention, diffusion or penetration of the sodium monochloroacetate into the cellulose fibers is promoted and reaction with a small amount of the alkali, which has penetrated into the fiber, is effected to obtain CMC having a uniform substituent distribution. It is necessary in the present invention to initiate the reaction in the presence of an excess amount of the etherifying agent. It is desirable that the reaction be carried out in the above-mentioned 0.10 to 0.99 molar ratio range for at least 30% of the etherification reaction time period.

As the reaction solvent used in the process of the present invention, there can be mentioned aqueous organic solvents such as ethyl alcohol, n-propyl alcohol, isopropyl alcohol (hereinafter referred to as IPA), n-butyl alcohol, isobutyl alcohol, tert-butyl alcohol or acetone, as well as aqueous organic solvent mixtures such as ethyl alcohol/benzene, ethyl alcohol/toluene or ethyl alcohol/n-hexane. As the alkali, sodium hydroxide or potassium hydroxide is suitably used. As the etherifying agent, there can be used monochloroacetic acid, sodium monochloroacetate, potassium monochloroacetate or an ester of monochloroacetic acid such as ethyl, n-propyl, isopropyl, n-butyl, isobutyl or tert-butyl monochloroacetate.

The degree of substitution (hereinafter referred to as DS) of the CMC produced by the process of the present invention is variable within the range of 0.5 to 3.0. The process of the invention is particularly advantageous in the production of CMC having a DS in the range of 0.8 to 2.0 which is substantially equal to that of commercially available CMC prepared using a large amount of the alkali.

CMC produced by the process of the present invention contains the substituents uniformly introduced therein. Therefore, as compared with CMC produced by the conventional processes, it contains smaller amounts of (1) insoluble matter and (2) large, partially dissolved, swollen gel, and therefore it has a higher transparency. When CMC obtained according to the present invention is used as an ingredient of a printing paste, clogging of the screen is reduced. Further, CMC thus obtained has an excellent resistance to putrefaction, which is a very important practical physical property for CMC to be used for drilling engineering works, oil well drilling, production of drinks fermented with lactic acid bacteria, tooth pastes, printing pastes, liquid pastes and fiber wall materials.

The inventors have further found that CMC having an average degree of substitution (DS) of as high as 0.9 to 3.0, preferably 2.0 to 3.0, can be obtained with a high monochloroacetic acid availability by a process comprising reacting a cellulosic material with an etherifying agent, in the presence of an alkali, in an aqueous organic solvent, to form an alkali salt of a carboxymethylcellulose ether. This process comprises a first reaction sequence wherein the etherification reaction is initiated in a first or initial stage at a molar ratio of alkali/etherifying agent, namely, $$\frac{\left(\begin{array}{c}\text{number of moles of}\\ \text{alkali charged initially}\end{array}\right) - \left(\begin{array}{c}\text{number of moles of}\\ \text{alkali neutralized with}\\ \text{etherifying agent}\end{array}\right)}{\text{number of moles of etherifying agent charged}}$$

of at least 0.10 to 0.99, preferably 0.10 to 0.70, most preferably 0.30 to 0.70, in the reaction system after the addition of a portion of the total alkali and a portion, preferably the entire amount, of the etherifying agent. The reaction is further carried out in a second stage wherein the remainder of the alkali is added in one or more subportions to the mixture so as to prevent the acidification of the reaction system due to the alkali consumption as the etherification reaction and the side reactions proceed, whereby to complete the etherification reaction of the first reaction sequence at a final molar ratio of alkali/etherifying agent, namely, $$\frac{\left(\begin{array}{c}\text{number of moles of}\\ \text{total alkali charged}\end{array}\right) - \left(\begin{array}{c}\text{number of moles of}\\ \text{alkali neutralized with}\\ \text{etherifying agent}\end{array}\right)}{\text{number of moles of etherifying agent charged}}$$

of 1.00 to 1.50, preferably 1.00 to 1.30, to obtain CMC having an average degree of substitution (DS) of 0.8 to 2.2. This is followed by a second reaction sequence wherein the etherifying agent and alkali are added to the thus-obtained CMC from the first reaction sequence to again initiate the etherification reaction in a first or initial stage at a molar ratio of alkali/etherifying agent, namely, $$\frac{\left(\begin{array}{c}\text{number of moles of}\\ \text{alkali charged initially}\end{array}\right) - \left(\begin{array}{c}\text{number of moles of}\\ \text{alkali neutralized with}\\ \text{etherifying agent}\end{array}\right)}{\text{number of moles of etherifying agent charged}}$$

of 0.10 to 0.99, and the alkali is added again, in a second stage, in one or more subportions to the mixture so as to prevent the acidification of the reaction system due to the alkali consumption as the etherification reaction and the side reactions proceed, whereby to complete the etherification reaction of the second reaction sequence at a molar ratio of alkali/etherifying agent, namely, $$\frac{\left(\begin{array}{c}\text{number of moles of}\\ \text{total alkali charged}\end{array}\right) - \left(\begin{array}{c}\text{number of moles of}\\ \text{alkali neutralized with}\\ \text{etherifying agent}\end{array}\right)}{\text{number of moles of etherifying agent charged}}$$

of 1.00 to 1.50, preferably 1.00 to 1.30. The second reaction sequence amounts to a repetition of the first reaction sequence using the 0.8 to 2.2 substituted CMC, from the first reaction sequence, as the starting material.

According to this second embodiment of the present invention, CMC having a DS as high as at least 2.00, particularly at least 2.50, can be produced using a two reaction sequence process, with a high availability of monochloroacetic acid, by controlling the side reaction (1) by reducing the amount of the alkali in the reaction system by maintaining the molar ratio of alkali/etherifying agent in the initial stages of the first and second reaction sequences in the range of 0.1 to 0.99, preferably 0.10 to 0.70, most preferably 0.30 to 0.70. The reaction conditions, in particular the materials usable as the alkali, cellulosic material, etherifying agent and aqueous organic solvent are the same as in the first embodiment of the invention.

It is necessary to initiate the reaction in the presence of an excess amount of the etherifying agent in the initial stages of both of the first and second reaction sequences. It is desirable that the initial stages of both reaction sequences be carried out in the above-mentioned molar ratio range of 0.10 to 0.99, preferably 0.10 to 0.70, for at least 30% of the total etherification reaction period in each reaction sequence.

In the production of CMC by the process of the second embodiment of the invention, the reaction in the second reaction sequence, to be carried out after completion of the reaction in the first reaction sequence, can be effected by a method wherein the excess alkali contained in the reaction mixture is neutralized with, for example, acetic acid after completion of the etherification reaction in the first reaction sequence. The mixture is then washed with a 75% aqueous methanol solution to remove by-products, such as common salt, sodium glycolate and sodium acetate, and the residue is dried and subjected to the reaction in the second reaction sequence. Alternatively, a method wherein the etherification reaction mixture from the first reaction sequence is cooled to a given temperature and subjected directly to the reaction of the second reaction sequence can be employed.

The degree of substitution (DS) of CMC produced by the two-reaction sequence process of the present invention varies in the range of 0.9 to 3.0. This two-reaction sequence process is particularly advantageous in the production of CMC having a DS of higher than 2.0, particularly higher than about 2.5, because the production of CMC having such a high DS has been difficult to attain with conventional one-step processes.

CMC produced on a commercial scale by the process of the second embodiment of the present invention has a DS of higher than 2.00, particularly higher than 2.5. Therefore, as compared with CMC having a DS of less than 2.00 produced on a commercial scale by the conventional processes, it has higher water-solubility, and aqueous solutions thereof have a higher resistance to chemicals. Therefore, CMC of the invention is preferable for use as an assistant in the production of printing pastes, in drilling engineering works, oil well drilling, as an additive for drinks fermented with lactic acid bacteria or for tooth pastes. In addition, it will be possible to use the CMC of the invention as a reactive, high molecular weight intermediate for other derivatives in other fields. According to the invention, the esterification reaction is conducted at 30° to 90° C., preferably 60° to 80° C., for 5 to 320 minutes, preferably 30 to 90 minutes, The weight ratio of isopropanol to water is 1/1 to 30/1, preferably 4/1 to 20/1. The weight ratio of the solvent mixture to cellulose is 2/1 to 50/1, preferably 3/1 to 30/1. It is preferred that the first stage be ended when 90 to 99 wt.% of NaOH has been used, and the second stage be ended when 100% of the etherifying agent has been used.

The following examples and comparative examples will further illustrate the present invention.

The following properties of the resulting CMC, obtained by the process of the invention, were measured or determined as described below:

(1) degree of substitution (DS), (2) transparency, (3) amount of glucose formed by hydrolysis with cellulase (uniformity of the substituent distribution), (4) resistance to putrefaction, (5) availability of monochloroacetic acid (AM) and (6) viscosity.

(1) Degree of substitution (DS):

1 g of CMC was weighed accurately and incinerated in a platinum or porcelain crucible at 600° C. Sodium oxide formed by the incineration was titrated with N/10 sulfuric acid, using phenolphthalein as an indicator. From the amount (A ml) of the titrant added, DS was calculated according to the formula:

$$DS = \frac{162 \times A \times f}{10000 - (80 \times A \times f)}$$

wherein f represents a titer of N/10 sulfuric acid.

(2) Transparency:

The transparency of a 1 wt.% aqueous CMC solution irradiated with a given light source is determined by the height of a liquid column. This is a method conventionally employed in the art. If the reaction is heterogeneous, the transparency is reduced by the unreacted cellulose, undissolved matter, swollen gel, etc. The higher the homogeneity of the reaction is, the higher the transparency will be.

(3) Amount of glucose formed by hydrolysis with cellulase (uniformity of substituent distribution):

The substituent distribution of CMC includes (1) the distribution of hydroxyl groups in 2-, 3- and 6-positions in the anhydroglucose unit, (2) intramolecular distribution and (3) intermolecular distribution. It is considered that these three types of substituent distributions are closely related to the physical properties of CMC. Further, the intramolecular and intermolecular substituent distributions supposedly exert a great influence on the amount and size of the undissolved matter and the semi-dissolved, swollen gel, and the resistance to putrefaction, both of which are important practical physical properties.

The uniformity of the substituent distribution in the present invention was determined by adding 5 mg/g-CMC of a cellulase (cellulase AP; a product of Amano Seiyaku Co., Ltd.) to a 1% aqueous CMC solution to hydrolyze the CMC at room temperature for 140–145 hours, the hydrolysis being substantially complete in about 140 hours. Glucose formed by the hydrolysis was determined according to the glucose oxidase method, as described by M. G. Wirick et al, J. Poly. Sci., Part A-1, vol. 6, 1965 ('68), which discloses that a CMC molecule having a chain of at least 3 unsubstituted anhydroglucose units is hydrolyzed in the presence of a cellulase (a hydrolase for cellulose). The smaller the amount of glucose formed, the higher is the uniformity of the substituent distribution. The substituent distribution measured herein includes both intramolecular and intermolecular distributions.

The amount of glucose formed is represented by the number of glucose molecules per 1000 anhydroglucose units in the CMC (number /1000 AGU).

(4) Resistance to putrefaction:

It is considered that CMC is putrefied mainly due to the hydrolysis by cellulase produced by microorganisms. The resistance to putrefaction was determined from a viscosity ratio before and after the hydrolysis, using a 1% aqueous solution with cellulase as in (3), according to the formula:

$$\text{viscosity ratio} = \frac{\text{viscosity of 1\% aqueous solution after hydrolysis with cellulase* (cP)}}{\text{viscosity of 1\% aqueous solution before hydrolysis with cellulase* (cP)}}$$

*The viscosity was measured by means of a Brookfield L-type viscometer (rotor Nos. 1–4) at 60 rpm at 25° C.

The higher the viscosity ratio is, the higher is the resistance to putrefaction.

(5) Availability of monochloroacetic acid (AM):
Availability of monochloroacetic acid (AM) was determined according to the formula:

$$AM = \frac{\text{degree of substitution of CMC formed}}{\text{number of moles of monochloroacetic acid charged per anhydroglucose unit}}$$

(6) Viscosity:
A 1% solution of 2.5 g of CMC was prepared in a cylindrical glass vessel having a diameter of 55 mm and a depth of 125 mm. The temperature was maintained at 25° C. After rotation at a rotor speed of 60 rpm for 1 minute, the viscosity was measured with a Brookfield L-type viscometer. By multiplying the resulting value by a given constant, the viscosity (cP) was determined.

The following examples do not limit the present invention. In the Examples and Comparative Examples, parts and percentages are given by weight.

EXAMPLE 1

575 parts of isopropyl alcohol (hereinafter referred to as IPA) were charged in a 5 liter reactor having two-shaft stirring blades, and a solution of 120.6 parts of sodium hydroxide (purity: 98%) in 126.2 parts of pure water was charged therein. After cooling to 20° to 30° C., 200 parts of powdery cellulose (purity: 95%) were added to the mixture, and the mixture was stirred at 20° to 30° C. for 60 minutes to obtain an alkali cellulose. Then, a solution of 172 parts of monochloroacetic acid (purity: 98%) in 172 parts of IPA was added thereto under cooling and the mixture was stirred at 20° to 30° C. for 30 minutes. Thereafter, the temperature was elevated to 60° C. over about 10 minutes and the etherification reaction was carried out for 60 minutes. Then a solution of 25.2 parts of sodium hydroxide in 16.8 parts of pure water was added thereto and the mixture was stirred at 60° to 70° C. for 15 minutes. After the etherification reaction was carried out at 70° C. for 90 minutes, the very small amount of sodium hydroxide remaining was neutralized with acetic acid.

After completion of the reaction, the reaction mixture was taken out of the reactor and centrifuged to remove IPA (reaction solvent). The residue was washed with 4000 parts of a 75% aqueous methyl alcohol solution three times to remove by-produced common salt, sodium glycolate and sodium acetate. The residue was centrifuged again to remove the aqueous methyl alcohol solution. The product thus purified was dried with a dryer at 80° to 100° C. for about 6 hours to obtain the intended alkali salt of carboxymethylcellulose ether.

COMPARATIVE EXAMPLE 1

575 parts of IPA were charged in a 5 liter reactor having two-shaft stirring blades and a solution of 145.8 parts of sodium hydroxide (purity: 98%) in 143 parts of pure water was charged therein. After cooling to 20° to 30° C., 200 parts of powdery cellulose (purity: 95%) were added to the mixture and stirred at 20° to 30° C. for 60 minutes to obtain an alkali cellulose.

Then, a solution of 172 parts of monochloroacetic acid (purity: 98%) in 172 parts of IPA was added thereto under cooling and the mixture was stirred at 20° to 30° C. for 30 minutes. Thereafter, the temperature was elevated to 70° C. in about 15 minutes and the etherification reaction was carried out for 90 minutes. Then, the remaining very small amount of sodium hydroxide was neutralized with acetic acid.

After washing followed by drying, which were carried out in the same manner as in Example 1, purified alkali salt of carboxymethylcellulose ether was obtained by a conventional method as described in Example 1.

EXAMPLES 2–5

An alkali salt of carboxymethylcellulose ether, according to the present invention, was obtained by the same production, purification and drying methods as described in Example 1, except that the amounts of IPA, water, sodium hydroxide and monochloroacetic acid were altered as shown in Table 1.

COMPARATIVE EXAMPLES 2–5

An alkali salt of carboxymethylcellulose ether was obtained according to the conventional process by the same production, purification and drying methods as in Comparative Example 1 except that the amounts of IPA, water, sodium hydroxide and monochloroacetic acid were altered as shown in Table 1.

EXAMPLE 6

1124 Parts of IPA were charged in a 5 liter reactor having two-shaft stirring blades and a solution of 163.2 parts of sodium hydroxide (purity: 98%) in 126.0 parts of pure water was charged therein. After cooling to 20° to 30° C., 200 parts of powdery cellulose (purity: 95%) were added to the mixture and stirred at 29° to 30° C. for 60 minutes to obtain an alkali cellulose. Then, a solution of 286.2 parts of monochloroacetic acid (purity: 98%) in 286.2 parts of IPA was added thereto under cooling, and the mixture was stirred at 20° to 30° C. for 30 minutes. Thereafter, the temperature was elevated to 60° C. in about 10 minutes and the etherification reaction was carried out for 60 minutes. A solution of 42.0 parts of sodium hydroxide in 28.0 parts of pure water was added thereto and the etherification reaction was continued at 60° C. for 60 minutes. A solution of 42.0 parts of sodium hydroxide in 28.0 parts of pure water was added thereto and the mixture was stirred at 60° to 70° C. for 15 minutes. The etherification reaction was carried out at 70° C. for 90 minutes. The remaining very small amount of sodium hydroxide was neutralized with acetic acid.

After purification followed by drying, both carried out in the same manner as described in Example 1, the intended alkali salt of carboxymethylcellulose ether was obtained.

The properties of the CMC obtained in the Examples and Comparative Examples are given in Table 1. Part of the results for the hydrolysis of CMC with cellulase is shown in the drawing with the degree of substitution (DS) of CMC as the abscissa and the amount of glucose formed as the ordinate. In the drawing, an open circle, " ", represents the results obtained for examples of the invention, and a darkened circle, " ", represents the results obtained for the Comparative Examples.

TABLE 1

| | | | | Experimental Conditions | | | | | | |
|---|---|---|---|---|---|---|---|---|---|---|
| | Powdery Cellulose (parts) | IPA (parts) | Total Pure Water* (parts) | Aqueous Sodium Hydroxide Solution added in First Stage | | Monochloroacetic Acid (MCA) Solution | | Molar Ratio in Initial Stage of Etherification Reaction $(A-B)/B$ | Supplemental Aqueous Sodium Hydroxide Solution | | Molar Ratio in the Final Stage of Etherification Reaction $(A+C-B)/B$ |
| | | | | NaOH A (parts) | $H_2O$ (parts) | MCA B (parts) | IPA (parts) | | NaOH C (part) | $H_2O$ (part) | |
| Example | | | | | | | | | | | |
| 1 | 200 | 575 | 143 | 120.6 | 126.2 | 172.0 | 172.0 | 0.66 | 25.2 | 16.8 | 1.00 |
| 2 | 200 | 609 | 143 | 88.2 | 123.4 | 139.0 | 139.0 | 0.50 | 29.4 | 19.6 | 1.00 |
| 3 | 200 | 996 | 194 | 136.8 | 163.6 | 215.5 | 215.5 | 0.50 | 45.6 | 30.4 | 1.00 |
| 4 | 200 | 1032 | 200.3 | 180.8 | 158.0 | 277.5 | 277.5 | 0.54 | 63.5 | 42.3 | 1.08 |
| 5 | 200 | 2160 | 230 | 286.3 | 166.3 | 450.9 | 450.9 | 0.50 | 95.4 | 63.7 | 1.00 |
| 6 | 200 | 1124 | 182 | 163.2 | 126.0 | 286.2 | 286.2 | 0.35 | first 42.0 | 28.0 | 1.04 |
| | | | | | | | | | second 42.0 | 28.0 | |
| Comparative Example | | | | | | | | | | | |
| 1 | 200 | 575 | 143 | 145.8 | 143.0 | 172.0 | 172.0 | 1.00 | 0 | 0 | 1.00 |
| 2 | 200 | 609 | 143 | 117.6 | 143.0 | 139.0 | 139.0 | 1.00 | 0 | 0 | 1.00 |
| 3 | 200 | 996 | 194 | 182.4 | 194.0 | 215.5 | 215.5 | 1.00 | 0 | 0 | 1.00 |
| 4 | 200 | 1032 | 200.3 | 244.3 | 200.3 | 277.5 | 277.5 | 1.08 | 0 | 0 | 1.08 |
| 5 | 200 | 2160 | 230 | 381.7 | 230 | 450.9 | 450.9 | 1.00 | 0 | 0 | 1.00 |

| | Experimental Results | | | | Hydrolysis with Cellulase | |
|---|---|---|---|---|---|---|
| | Degree of Substitution (DS) | Availability of Monochloroacetic Acid (AM) (%) | Transparency (m/m) | 1% viscosity (cps) | Resistance to Putrefaction (viscosity ratio) | Amount of Glucose Formed (Number/1000 AGU) |
| Example | | | | | | |
| 1 | 1.15 | 75.3 | 645 | 3850 | 0.084 | 1.9 |
| 2 | 0.95 | 77.0 | 545 | 3120 | 0.018 | 7.0 |
| 3 | 1.33 | 69.6 | above 700 | 2780 | 0.317 | 1.5 |
| 4 | 1.51 | 61.4 | above 700 | 900 | 0.450 | 0.94 |
| 5 | 1.89 | 47.3 | above 700 | 954 | 0.499 | 0.23 |
| 6 | 1.72 | 67.7 | above 700 | 1086 | 0.425 | 0.48 |
| Comparative Example | | | | | | |
| 1 | 1.08 | 70.7 | 580 | 5100 | 0.024 | 11.2 |
| 2 | 0.88 | 71.4 | 410 | 6580 | 0.002 | 18.2 |
| 3 | 1.20 | 62.8 | 680 | 4140 | 0.057 | 6.9 |
| 4 | 1.43 | 58.1 | above 700 | 2640 | 0.107 | 4.3 |
| 5 | 1.66 | 41.5 | above 700 | 1420 | 0.185 | 2.2 |

*In the case of Examples 1-6, the total pure water is the sum of the water added with NaOH in the first stage and the water added with NaOH in the second stage. In the case of Comparative Examples 1-5, the total pure water is the amount of water added with NaOH at the beginning of the reaction.

It is apparent from Table 1 and the drawing that the alkali salt of carboxymethylcellulose ether obtained by the process of the present invention has (1) higher availability of monochloroacetic acid, (2) higher transparency, (3) a far smaller amount of glucose formed by the hydrolysis with cellulase and, therefore, higher uniformity of the substituent distribution, and (4) more excellent resistance to putrefaction, in comparison with the alkali salts of carboxymethylcellulose ether obtained by the conventional process of the comparative examples using the same amounts of the alkali and etherifying agent.

EXAMPLE 7

996 Parts of isopropyl alcohol (IPA) were charged in a 5 liter reactor having two-shaft stirring blades and a solution of 136.8 parts of sodium hydroxide (purity: 98%) in 163.6 parts of pure water was charged therein. After cooling to 20° to 30° C., 200 parts of powdery cellulose (purity: 95%, average degree of polymerization: 2300) were added to the mixture, and the mixture was stirred at 20° to 30° C. for 60 minutes to obtain an alkali cellulose. Then, a solution of 215.5 parts of monochloroacetic acid (purity: 98%) in 215.5 parts of IPA was added thereto under cooling and the mixture was stirred at 20° to 30° C. for 30 minutes. Thereafter, the temperature was elevated to 60° C. over about 10 minutes and the etherification reaction was carried out for 60 minutes. A solution of 45.6 parts of sodium hydroxide in 30.4 parts of pure water was added thereto and the mixture was stirred at 60° to 70° C. for 15 minutes. After the etherification reaction was carried out at 70° C. for 90 minutes, the remaining very small amount of sodium hydroxide was neutralized with acetic acid. Thus, the reaction of the first reaction sequence was completed.

The reaction mixture was taken out of the reactor and centrifuged to remove IPA (reaction solvent). The residue was washed three times with 400 parts of a 75% aqueous methyl alcohol solution to remove byproducts, such as common salt, sodium glycolate and sodium acetate, and then dried at 80° to 100° C. for about 4 hours to obtain CMC.

CMC thus obtained was subjected to the reaction of the second reaction sequence in the same reactor under the same conditions as in the first step. After purification and drying, the intended CMC of the invention was obtained.

COMPARATIVE EXAMPLE 6

966 Parts of IPA were charged in a 5 liter reactor having two-shaft stirring blades and a solution of 182.4 parts of sodium hydroxide (purity: 98%) in 194 parts of pure water was charged therein. After cooling the mixture to 20° to 30° C., 200 parts of powdery cellulose (purity: 95%, average degree of polymerization: 2300) were added to the mixture and stirred at 20° to 30° C. for 60 minutes to obtain an alkali cellulose.

Then, a solution of 215.5 parts of monochloroacetic acid (purity: 98%) in 215.5 parts of IPA was added thereto under cooling and the mixture was stirred at 20° to 30° C. for 30 minutes. Thereafter, the temperature was elevated to 70° C. in about 15 minutes and the etherification reaction was carried out for 90 minutes. Then, the remaining very small amount of sodium hydroxide was neutralized with acetic acid. Thus, the reaction of the first reaction sequence was completed.

The reaction mixture was taken out of the reactor and centrifuged to remove IPA (reaction solvent). The residue was washed with 4000 parts of a 75% aqueous methyl alcohol solution three times to remove by-products and then dried at 80° to 100° C. for about 4 hours to obtain CMC.

CMC thus obtained was subjected to the reaction of the second reaction sequence in the same reactor under the same conditions as in the first reaction sequence. After the purification and drying procedures, CMC was obtained by a conventional recovery process.

EXAMPLE 8

CMC according to the present invention was obtained by the same production, purification and drying methods as in Example 7 except that the amounts of IPA, water, sodium hydroxide and monochloroacetic acid were altered as shown in Table 2.

COMPARATIVE EXAMPLES 7 AND 8

CMC was obtained according to the conventional process by the same production, purification and drying methods as in Comparative Example 6 except that the amounts of IPA, water, sodium hydroxide and monochloroacetic acid were altered as shown in Table 2.

EXAMPLE 9

1687 Parts of IPA were charged in a 5 liter reactor having two-shaft stirring blades and a solution of 255.2 parts of sodium hydroxide (purity: 98%) in 166.2 parts of pure water was charged therein. After cooling to 20° to 30° C., 200 parts of powdery cellulose (purity: 95%, average degree of polymerization: 2300) were added to the mixture and the mixture was stirred at 20° to 30° C. for 60 minutes to obtain an alkali cellulose. Then, a solution of 448.9 parts of monochloroacetic acid (purity: 98%) in 448.9 parts of IPA was added thereto under cooling and the mixture was stirred at 20° to 30° C. for 30 minutes. Thereafter, the temperature was elevated to 60° C. over about 10 minutes and the etherification reaction was carried out for 30 minutes. A solution of 63.7 parts of sodium hydroxide in 42.5 parts of pure water was added thereto and the etherification reaction was continued at 60° C. for 30 minutes. A solution of 82.9 parts of sodium hydroxide in 55.3 parts of pure water was added thereto and the mixture was stirred for 15 minutes. The etherification reaction was carried out at 70° C. for 90 minutes. After completion of the etherification reaction, sodium hydroxide remaining in a very small amount was neutralized with acetic acid to complete the reaction in the first reaction sequence.

The reaction mixture was then purified and dried in the same manner as described in Example 7. CMC thus obtained was subjected to the reaction of the second reaction sequence in the same reactor and under the same conditions as in the first reaction sequence. After purification and drying, CMC according to the present invention was obtained.

EXAMPLE 10

A solution of 1763 parts of IPA and 82.7 parts of sodium hydroxide (purity: 98%) in 93.0 parts of pure water was charged in a 3 liter separable flask. 75 Parts of powdery cellulose (purity: 95%, average degree of polymerization: 2300) were added to the mixture and stirred at 20° to 30° C. for 60 minutes to obtain an alkali cellulose. Then, a solution of 125.0 parts of monochloroacetic acid in 125.0 parts of IPA was added thereto in portions and the mixture was stirred at 20° to 30° C. for 30 minutes. Thereafter, the temperature was elevated to 60° C. and the etherification reaction was carried out at 60° C. for 60 minutes. A solution of 29.3 parts of sodium hydroxide in 19.5 parts of pure water was added thereto. The temperature was controlled to 70° C. and the etherification reaction was carried out at 70° C. for 60 minutes. Thus, the reaction in the first reaction sequence was completed.

Then, the reaction system was cooled to 15° C. and the reaction in the second reaction sequence was initiated. In this reaction sequence, a solution of 82.7 parts of sodium hydroxide in 55.1 parts of pure water was added thereto and stirred at 20° to 30° C. for 30 minutes. A solution of 125.0 parts of monochloroacetic acid in 125.0 parts of IPA was added thereto in portions and the mixture was stirred at 20° to 30° C. for 30 minutes.

Thereafter, the temperature was elevated at 60° C. in about 10 minutes and the etherification reaction was carried out for 60 minutes. Then a solution of 29.3 parts of sodium hydroxide in 19.5 g of pure water was added thereto. The temperature was controlled to 70° C. and the etherification reaction was carried out at 70° C. for 60 minutes. After completion of the etherification reaction, the remaining very small amount of sodium hydroxide was neutralized with acetic acid to complete the reaction of the second reaction sequence. The reaction mixture was centrifuged to remove IPA (reaction solvent). The product was washed three times with 2000 parts of a 75% aqueous methyl alcohol solution to remove by-products. After drying at 80° to 100° C. for about 4 hours, CMC of the present invention was obtained.

COMPARATIVE EXAMPLE 9

A solution of 1763 parts of IPA and 112.0 parts of sodium hydroxide in 112.5 parts of pure water was charged in a 3 liter separable flask. 75 parts of powdery cellulose (purity: 95%, average degree of polymerization: 2300) were added to the mixture and stirred at 20° to 30° C. for 60 minutes to obtain an alkali cellulose. Then, a solution of 125.0 parts of monochloroacetic acid in 125.0 parts of IPA was added thereto in portions and the mixture was stirred at 20° to 30° C. for 30 minutes. Thereafter, the temperature was elevated to 70° C. over about 15 minutes and the etherification reaction was carried out at 70° C. for 60 minutes. Thus, the reaction in the first reaction sequence was completed. Then, the reaction system was cooled to 15° C. and the reaction in the second reaction sequence was initiated. In this step, a solution of 112.0 parts of sodium hydroxide in 74.5 parts of pure water was added thereto and the whole was stirred at 20° to 30° C. for 30 minutes. A solution of 125.0 parts of monochloroacetic acid in 125.0 parts of IPA was added thereto and the mixture was stirred at 20° to 30° C. for 30 minutes.

Thereafter, the temperature was elevated to 70° C. in about 15 minutes and the etherification reaction was carried out for 60 minutes. After completion of the etherification reaction, the remaining very small amount of sodium hydroxide was neutralized with acetic acid to complete the reaction of the second reaction sequence.

After washing and drying in the same manner as described in Example 10, CMC was obtained according to a conventional process.

COMPARATIVE EXAMPLES 10 AND 11

The same procedure as in Comparative Example 6 was repeated except that the amounts of IPA, water, sodium hydroxide and monochloroacetic acid were altered as shown in Table 2 to complete the reaction in the first and the second steps. In Comparative Example 10, a third step reaction, the same as the second step reaction, was carried out on the second step reaction product and the product was purified in the same manner as in the second step. In Comparative Example 11, a further fourth step reaction, the same as the third step reaction, was carried out using the third step product as the starting material. Thus, CMC was obtained by conventional processes.

TABLE 2

| | | | | Experimental Conditions Reaction in the First Reaction Sequence | | | |
|---|---|---|---|---|---|---|---|
| | Number of steps | Cellulosic material (parts) | IPA (parts) | Aqueous NaOH Solution | | Monochloroacetic Acid (MCA) Solution | |
| | | | | NaOH (A) (parts) | $H_2O$ (parts) | MCA (B) (parts) | IPA (parts) |
| Ex. 7 | 2 | 200 | 996 | 136.8 | 163.6 | 215.5 | 215.5 |
| Comp. Ex. 6 | 2 | " | 996 | 182.2 | 194.0 | 215.5 | 215.5 |
| Ex. 8 | 2 | " | 754 | 181.3 | 168.0 | 278.2 | 278.2 |
| Comp. Ex. 7 | 2 | " | 754 | 244.9 | 210.4 | 278.2 | 278.2 |
| Ex. 9 | 2 | " | 1687 | 255.2 | 166.2 | 448.9 | 448.9 |
| Comp. Ex. 8 | 2 | " | 1687 | 401.8 | 264.0 | 448.9 | 448.9 |
| Ex. 10 | 2 | 75 | 1763 | 82.7 | 93.0 | 125.0 | 125.0 |
| Comp. Ex. 9 | 2 | " | 1763 | 112.0 | 112.5 | 125.0 | 125.0 |
| Comp. Ex. 10 | 3 | 200 | 1069 | 287.0 | 192.0 | 339.0 | 339.0 |
| Comp. Ex. 11 | 4 | " | " | " | " | " | " |

| | Experimental Conditions Reaction in the First Reaction Sequence | | | |
|---|---|---|---|---|
| | Molar Ratio in the Initial Stage of Etherification $[(A) - (B)]/(B)$ | Aqueous NaOH Solution Supplemented | | Mole Number in the Final Etherification Reaction $[(A) + (C) - (B)]/(B)$ |
| | | NaOH (C) (parts) | $H_2O$ (parts) | |
| Ex. 7 | 0.50 | 45.6 | 30.0 | 1.00 |
| Comp. Ex. 6 | 1.00 | 0 | 0 | 1.00 |
| Ex. 8 | 0.54 | 63.6 | 42.4 | 1.08 |
| Comp. Ex. 7 | 1.08 | 0 | 0 | 1.08 |
| Ex. 9 | 0.33 | First 63.7 Second 82.9 | 42.5 55.3 | 1.10 |
| Comp. Ex. 8 | 1.10 | 0 | 0 | 1.10 |
| Ex. 10 | 0.55 | 29.3 | 19.5 | 1.10 |
| Comp. Ex. 9 | 1.10 | 0 | 0 | 1.10 |
| Comp. Ex. 10 | 1.10 | 0 | 0 | 1.00 |
| Comp. Ex. 11 | " | " | " | " |

| | | | Experimental Conditions Reaction in the Second Reaction Sequence** | | | |
|---|---|---|---|---|---|---|
| | IPA (parts) | Residue NaOH from the First Reaction Sequence (D) (parts) | Aqueous NaOH Solution | | Monochloroacetic Acid (MCA) Solution | |
| | | | NaOH (E) (parts) | $H_2O$ (parts) | MCA (F) (parts) | IPA (parts) |
| Ex. 7 | 996 | 0 | 136.8 | 163.6 | 215.5 | 215.5 |
| Comp. Ex. 6 | 996 | 0 | 182.4 | 194.0 | 215.5 | 215.5 |
| Ex. 8 | 754 | 0 | 181.3 | 168.0 | 278.2 | 278.2 |
| Comp. Ex. 7 | 754 | 0 | 244.9 | 210.4 | 278.2 | 278.2 |
| Ex. 8 | 1687 | 0 | 255.2 | 166.2 | 448.9 | 448.9 |
| Comp. Ex. 8 | 1687 | 0 | 401.8 | 264.0 | 448.9 | 448.9 |
| Ex. 10 | 1763 | 5.3 | 82.7 | 93.0 | 125.0 | 125.0 |
| Comp. Ex. 9 | 1763 | 5.3 | 112.0 | 112.5 | 125.0 | 125.0 |
| Comp. Ex. 10 | 1069 | 0 | 287.0 | 192.0 | 339.0 | 339.0 |
| Comp. Ex. 11 | " | " | " | " | " | " |

| | Experimental Conditions Reaction in the Second Reaction Sequence** | | |
|---|---|---|---|
| | Molar Ratio in the Initial Stage | Aqueous NaOH Solution Supplemented | Mole Number in the Final |

TABLE 2-continued

|  | of Etherification [(D) + (E) − (F)]/(F) | NaOH (G) (parts) | H₂O (parts) | Etherification Reaction [(D) + (E) + (G) − (F)]/(F) |
|---|---|---|---|---|
| Ex. 7 | 0.50 | 45.6 | 30.4 | 1.00 |
| Comp. Ex. 6 | 1.00 | 0 | 0 | 1.00 |
| Ex. 8 | 0.54 | 63.6 | 42.4 | 1.08 |
| Comp. Ex. 7 | 1.08 | 0 | 0 | 1.08 |
| Ex. 9 | 0.33 | First 63.7 | 42.5 | 1.10 |
|  |  | Second 82.9 | 55.3 |  |
| Comp. Ex. 8 | 1.10 | 0 | 0 | 1.10 |
| Ex. 10 | 0.65 | 29.3 | 19.5 | 1.20 |
| Comp. Ex. 9 | 1.20 | 0 | 0 | 1.20 |
| Comp. Ex. 10 | 1.00 | 0 | 0 | 1.00 |
| Comp. Ex. 11 | " | " | " | " |

|  | Experimental Results | | | |
|---|---|---|---|---|
|  | Average Degree of Substitution (DS)*** | Availability of Monochloroacetic Acid (AM) (%) | 1% Viscosity (cps) | Transparency (m/m) |
| Ex. 7 | 2.41 (1.33) | 63.0 | 350 | above 700 |
| Comp. Ex. 6 | 1.95 (1.15) | 51.0 | 684 | " |
| Ex. 2 | 2.70 (1.63) | 54.8 | 108 | " |
| Comp. Ex. 7 | 2.05 (1.25) | 41.6 | 284 | " |
| Ex. 9 | 2.95 (1.92) | 36.9 | 78 | " |
| Comp. Ex. 8 | 2.41 (1.68) | 30.1 | 185 | " |
| Ex. 10 | 2.55 (1.61) | 42.5 | 546 | " |
| Comp. Ex. 9 | 2.08 (1.32) | 34.7 | 824 | " |
| Comp. Ex. 10 | 2.75 (1) 1.55 (2) 2.30 | 30.6 | 206 | " |
| Comp. Ex. 11 | 2.96 (1) 1.55 (2) 2.30 (3) 2.75 | 24.7 | 128 | " |

**In the case of Comparative Examples 10 and 11, the experimental conditions in the third and fourth reaction sequences were the same as the experimental conditions in the second reaction sequence thereof.
***Numerals in the parentheses indicate DS in the first step except that those in Comparative Examples 10 and 11 indicate DS in steps (1), (2) and (3).

It is apparent from Table 2 that, as compared with the conventional processes, the process of the present invention for the production of CMC having a high degree of substitution exhibits a far higher availability of monochloroacetic acid, which is an expensive etherifying agent. According to the process of the present invention, CMC having a degree of substitution of as high as above 2.00, particularly above 2.50, can be produced by the two reaction sequence process, whereas this compound has been produced by three- to five-step processes in the prior art. According to the process of the invention, the production of CMC having such a high degree of substitution on an industrial scale is made possible.

The embodiments of the invention in which an exclusive property or privilege is claimed are defined as follows:

1. A two stage process for preparing an alkali metal salt of carboxymethylcellulose ether, which comprises: in a first reaction stage, reacting cellulose, in the presence of an alkali in an aqueous organic solvent, with an etherifying agent effective to etherify said cellulose to form carboxymethylcellulose ether, wherein the entire amount of said etherifying agent is present in the reaction mixture during the first reaction stage and the molar ratio of said alkali/said etherifying agent equal to $$\frac{\left(\begin{array}{c}\text{number of moles of}\\\text{alkali charged}\end{array}\right) - \left(\begin{array}{c}\text{number of moles of}\\\text{alkali neutralized with}\\\text{etherifying agent}\end{array}\right)}{\text{number of moles of etherifying agent charged}}$$

is in the range of from 0.10 to 0.99 during the first reaction stage, until said cellulose is partially etherified and converted to carboxymethylcellulose ether; and then, in a second reaction stage, adding additional alkali in one or more portions to the reaction mixture obtained from said first stage, without adding more of said etherifying agent, until said molar ratio of said alkali/said etherifying agent is at least 1.00 and completing the etherification reaction; and then recovering said alkali metal salt of carboxymethylcellulose ether from the reaction mixture.

2. A process as claimed in claim 1 in which said molar ratio is in the range of from 0.10 to 0.70 in the first reaction stage and said molar ratio is in the range of from 1.00 to 1.50 in the second reaction stage.

3. A process according to claim 2, wherein said molar ratio is in the range of 0.30 to 0.70 in said first stage.

4. A two reaction sequence process for preparing an alkali metal salt of carboxymethylcellulose ether wherein each reaction sequence comprises two sequential reaction stages, which comprises: in the first reaction stage of the first reaction sequence, reacting cellulose, in the presence of an alkali in an aqueous organic solvent, with an etherifying agent effective to etherify said cellulose to form carboxymethylcellulose ether, wherein the entire amount of said etherifying agent used in the first reaction sequence is present in the reaction system during the first reaction stage and the molar ratio of said alkali/said etherifying agent equal to $$\frac{\left(\begin{array}{c}\text{number of moles of}\\ \text{alkali charged}\end{array}\right) - \left(\begin{array}{c}\text{number of moles of}\\ \text{alkali neutralized with}\\ \text{etherifying agent}\end{array}\right)}{\text{number of moles of etherifying agent charged}}$$

is in the range of from 0.10 to 0.99, until said cellulose is partially etherified and converted to carboxymethylcellulose ether; then, in a second reaction stage of the first reaction sequence, adding additional alkali in one or more portions to the reaction mixture obtained from said first stage, without adding more of said etherifying agent, until said molar ratio of said alkali/said etherifying agent is in the range of from 1.00 to 1.50, and completing the etherification reaction to obtain an alkali metal salt of carboxymethylcellulose ether having an average degree of substitution of from 0.8 to 2.2; then in the first reaction stage of the second reaction sequence, reacting said alkali metal salt of carboxymethylcellulose obtained from said first reaction sequence, in the presence of an alkali in an aqueous organic solvent, with an additional quantity of said etherifying agent wherein during the first reaction stage of said second reaction sequence the molar ratio of said alkali/said etherifying agent is in the range of from 0.10 to 0.99, until the degree of substitution of said alkali metal salt of carboxymethylcellulose is further increased; and then in the second stage of said second reaction sequence, adding an additional quantity of said alkali in one or more portions, without adding additional etherifying agent, until said molar ratio of said alkali/said etherifying agent is in the range of from 1.00 to 1.50 to obtain an alkali metal salt of caboxymethylcellulose having a degree of substitution higher than that of the alkali metal salt of carboxymethylcellulose obtained at the end of said first reaction sequence and in the range of from 0.9 to 3.0; and then recovering said latter alkali metal salt of carboxymethylcellulose from the reaction mixture.

5. A process as claimed in claim 4 in which said molar ratio in said first stage of said first reaction sequence and said first stage of said second reaction sequence is from 0.10 to 0.70.

6. A process according to claim 5, wherein said molar ratio is in the range of from 0.30 to 0.70 in said first stage of said first reaction sequence and said first stage of said second reaction sequence.

7. A process as claimed in claim 5, wherein said molar ratio is in the range of 1.0 to 1.3 at the completion of said second stage of said second reaction sequence.

8. A process according to claim 1 or claim 4, wherein said etherifying agent is selected from the group consisting of monochloroacetic acid, sodium monochloroacetate, potassium monochloroacetate, and monochloroacetic acid esters, and wherein said alkali is sodium hydroxide or potassium hydroxide.

9. A process according to claim 4, wherein said latter alkali salt of carboxymethylcellulose ether recovered from the reaction mixture has a degree of substitution of 2.0 to 3.0.

10. A process as claimed in claim 4, including the step of purifying and isolating said alkali metal salt of carboxymethylcellulose ether obtained from the second reaction stage of said first reaction sequence and then utilizing same in the first reaction stage of said second reaction sequence.

11. A process as claimed in claim 10, wherein said purifying and isolating step comprises neutralizing with an acid the excess alkali contained in the reaction mixture from said second reaction stage of said first reaction sequence, washing said reaction mixture with an aqueous alcohol solution to remove impurities including salt, sodium glycolate and sodium acetate therefrom, and drying the resulting residue, said residue being said alkali metal salt of carboxymethylcellulose ether having an average degree of substitution of from 0.8 to 2.2.

12. A process as claimed in claim 4, wherein said alkali metal salt of carboxymethylcellulose ether obtained in said second reaction stage of the first reaction sequence is subjected directly to said first reaction stage of the second reaction sequence without purification and isolation thereof.

13. A process as claimed in claim 4, wherein said latter alkali metal salt of carboxymethylcellulose ether recovered from said reaction mixture has a degree of substitution of at least 2.5.

14. A two stage process for preparing an alkali metal salt of carboxymethylcellulose, which comprises: in a first reaction stage, dissolving a water-soluble alkali in a solvent mixture of isopropanol and water in which the weight ratio of isopropanol/water is from about 1/1 to about 30/1, adding cellulose to said solvent mixture in such an amount that the weight ratio of said solvent mixture/said cellulose is from about 2/1 to about 50/1 whereby to form a slurry, then adding monochloroacetic acid to said slurry so that the molar ratio of said alkali/said monochloroacetic acid equal to $$\frac{\left(\begin{array}{c}\text{number of moles of}\\ \text{alkali charged}\end{array}\right) - \left(\begin{array}{c}\text{number of moles of}\\ \text{alkali neutralized with}\\ \text{monochloroacetic acid}\end{array}\right)}{\text{number of moles of monochloroacetic acid charged}}$$

is in the range of from 0.30 to 0.70, then heating said slurry to a temperature in the range of from 30° to 90° C. for from about 5 to 320 minutes to partially etherify said cellulose to convert same to carboxymethylcellulose ether; and then, in a second reaction stage, adding additional alkali in one or more portions to the reaction mixture obtained from said first stage, without adding more of said monochloroacetic acid, until said molar ratio is in the range of from 1.00 to 1.50, then heating the reaction mixture to a temperature in the range of from 30° to 90° C. for from about 5 to 320 minutes to complete the etherification reaction; and then recovering from the reaction mixture an alkali metal salt of carboxymethylcellulose having a degree of substitution of from 0.8 to 2.2.

15. A two reaction sequence process for preparing an alkali metal salt of carboxymethylcellulose wherein each reaction sequence comprises two sequential reaction stages, which comprises: in the first reaction stage of the first reaction sequence, dissolving a water-soluble alkali in a first solvent mixture of isopropanol and water in which the weight ratio of isopropanol/water is from about 1/1 to about 30/1, adding cellulose to said first solvent mixture containing said alkali in such an amount that the weight ratio of said first solvent mixture/said cellulose is from about 2/1 to about 50/1 whereby to form a slurry, then adding monochloroacetic acid to said slurry so that the molar ratio of said alkali/said monochloroacetic acid equal to $$\frac{\text{number of moles of alkali charged} - \text{number of moles of alkali neutralized with monochloroacetic acid}}{\text{number of moles of monochloroacetic acid charged}}$$

is in the range of from 0.30 to 0.70, then heating said slurry to a temperature in the range of from 30° to 90° C. for from about 5 to 320 minutes to partially etherify said cellulose to convert same to carboxymethylcellulose ether; and then, in a second reaction stage of the first reaction sequence, adding additional alkali in one or more portions to the reaction mixture obtained from said first stage, without adding more of said monochloroacetic acid, until said molar ratio is in the range of from 1.00 to 1.50, then heating the reaction mixture to a temperature in the range of from 30° to 90° C. for from about 5 to 320 minutes to complete the etherification reaction to obtain an alkali metal salt or carboxymethylcellulose having a degree of substitution of from 0.8 to 2.2; then in the first stage of the second reaction sequence, adding said alkali metal salt of carboxymethylcellulose ether having a degree of substitution of from 0.8 to 2.2 obtained in said first reaction sequence to a second solvent mixture containing said alkali having the same range of the same components as said first solvent mixture, then adding monochloroacetic acid thereto to form a second reaction mixture in which said molar ratio of said alkali/said monochloroacetic acid in said second reaction mixture is in the range of from 0.3 to 0.7, then heating said second reaction mixture to a temperature in the range of from 30° to 90° C. for from about 5 to 320 minutes to further increase the degree of substitution of said alkali metal salt of carboxymethylcellulose; then in the second stage of said second reaction sequence adding an additional quantity of said alkali in one or more portions to the second reaction mixture, without adding more of said monochloroacetic acid until said molar ratio is in the range of from 1.00 to 1.50, then heating the second reaction mixture to a temperature in the range of from 30° to 90° C. for from about 5 to 320 minutes to obtain an alkali metal salt of carboxymethylcellulose having a degree of substitution higher than that of the alkali metal salt of carboxymethylcellulose obtained at the end of said first reaction sequence and in the range of from 2.0 to 3.0; and then recovering said latter salt of carboxymethylcellulose from the second reaction mixture.

* * * * *